United States Patent

[11] 3,631,237

[72] Inventors: Michael John Sole, Randburg; Peter John Walker, Johannesburg, both of South Africa
[21] Appl. No.: 42,804
[22] Filed: June 2, 1970
[45] Patented: Dec. 28, 1971
[73] Assignee: Anglo American Corporation of Republic of South Africa Limited
[32] Priority: June 4, 1969
[33] South Africa
[31] 69/3973

[54] HIGH TEMPERATURE CELLS
10 Claims, 3 Drawing Figs.
[52] U.S. Cl. .................................... 250/43.5 R, 356/77
[51] Int. Cl. .................................... G01n 21/26

[50] Field of Search .................................... 250/43.5 R; 356/77

[56] References Cited
OTHER REFERENCES
" Construction of a Dual Beam Heated Infrared Cell," John Neu, Journal of Optical Soc. of Am., Vol. 43, No. 6, June 1953, pp. 520, 521

Primary Examiner—Archie R. Borchelt
Assistant Examiner—C. E. Church
Attorney—Waters, Roditi, Schwartz & Nissen ABSTRACT: For examining gases in infrared spectrometers and other types of spectrometers the gases are pumped into a space with opposed windows adapted to be positioned along the line of examination. To seal off the gas inside and to withdraw the gas a curtain of an inert gas is flowed on the outside past each of the windows.

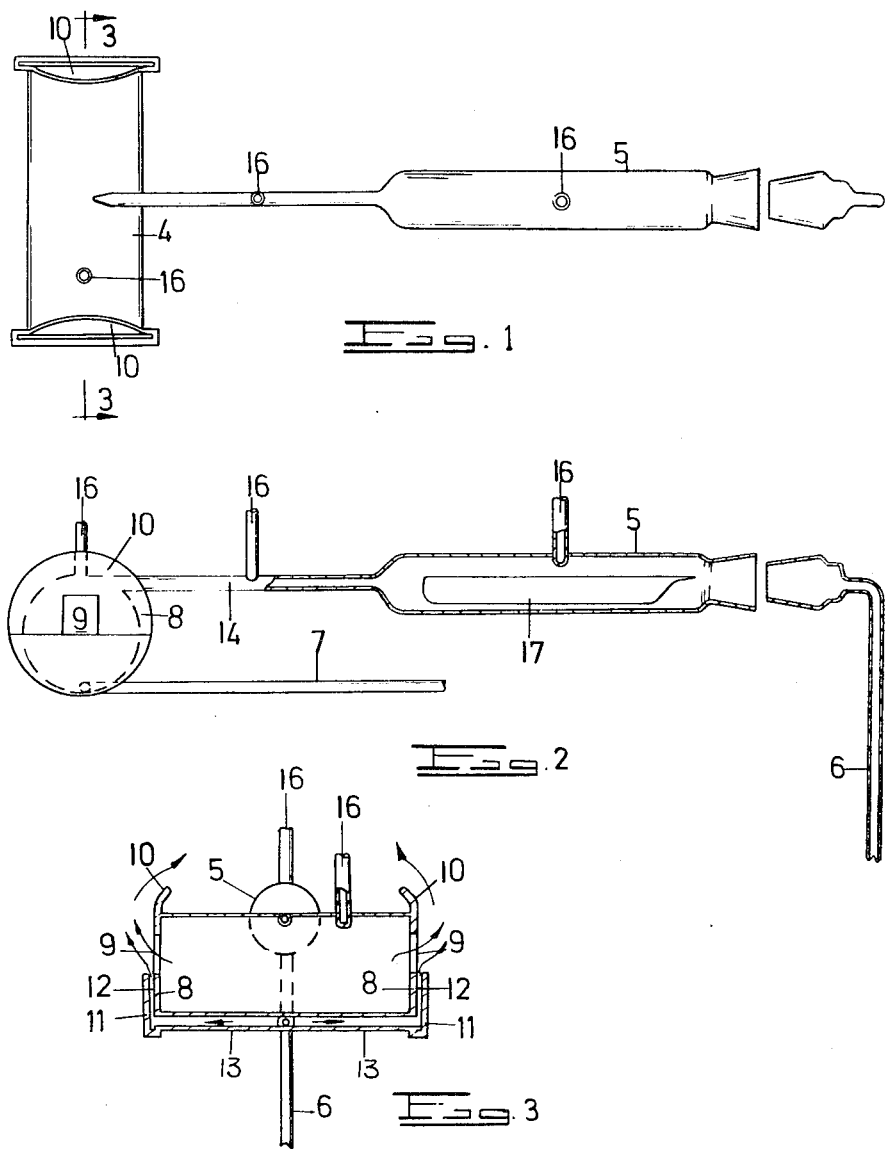

HIGH TEMPERATURE CELLS

This invention relates to high temperature cells of the kind which are used in spectrometry. The characteristic of the cells with which the invention is concerned is that at least one window is provided to allow the entry or exit of electromagnetic radiation. In most cases there are two opposed windows allowing radiations, such as infrared radiation, to pass through the cell.

Existing high temperature cells are of two kinds. In the first kind the cell is heated uniformly over its entire length and the windows are made of a solid material transparent to the radiation in question. In this type the temperature to which the cell can be heated is limited by the temperature which the window can withstand or up to which it maintains a suitable transparency. With most conventional window materials the upper limit of temperature is about 350° C. In addition the gas sample may cause deterioration of the windows.

In the second kind the cell is made long with windows at each end. Heat is applied to the center of the cell and the window ends are kept at a suitable low temperature dictated by the solid window material. The disadvantage is that a temperature gradient exists along the length of the cell and that in order to deal with the cell the optical systems have to be more complicated that with the first type. Conventional infrared machines are not available to take long cells.

An object of the invention is to provide a cell that is more suitable than the kinds discussed above.

According to the invention a gas examination cell suitable for use at high temperature of the kind formed as a hollow body with at least one window to allow the entry or exit of electromagnetic radiations is characterized in that or each window is an open aperture through which gas can flow and in that means is provided to cause a curtain of an inert gas to flow adjacent the aperture and parallel to the plane of the aperture to seal off the cell.

The invention is further described below with reference to the accompanying drawings, in which FIG. 1 is a plan view of apparatus including a cell according to invention, FIG. 2 is an end view of the apparatus of FIG. 1, and FIG. 3 is a section on the line 3—3 in FIG. 1.

In the drawings an apparatus consisting essentially of four units has been illustrated. There is a high temperature cell 4, a generator 5, a carrier gas preheating tube 6 and a shield gas carrying tube 7. All of these units are wound with heating wires and suitable insulation which have been left off the drawing for the sake of clarity.

The cell 4 is substantially cylindrical in shape and is closed off by end plates 8 provided with apertures 9 and curved at their upper sections 10 for purposes to be described later on. Adjacent the plates 8 there are two further plates 11 so that between the plates 8 and 11 and below each aperture 9 a fan-shaped open-mouthed slot 12 is defined. The slots 12 are fed by branch pipes 13 off the tube 7. Thus if gas under pressure is fed to the tube 7 a fan-shaped jet emerges from each of the slots 12 past and parallel to the window or aperture 9.

Above the cell 4 a suitable suction device (not shown) is provided. The emergent gas is guided by the curved portions 10 of the plates 8.

A pipe 14 leads from the generator 5 to the cell 5. The generator 5 is fed with preheated carrier gas along the tube 6. As said above, the parts are covered by heating coils. The heating coils are controlled by thermocouples inserted into wells 16 and suitable thermostats.

In use a boat 17 containing a sample of any material to be examined is put into the generator 5. A carrier gas, e.g. nitrogen is introduced into the tube 6 where it is preheated. Alternatively, if a gas is to be studied, the gas itself is fed into the tube 6. The gas then carries the vaporized or gasified material from the boat 17 along the pipe 14 to the cell 4 from which it passes into the shield gas of the jets. As said above the gas for the jets may also be preheated. A suitable shield gas is nitrogen.

The jets of gas serve a dual purpose: firstly they prevent hot and possible corrosive gases from entering the spectrophotometer and secondly they remove the hot sample vapor from the light path before it cools. The jet gas inlet tube 7 may be heated and the jets themselves are an integral part of the cell so that no condensation takes place in the path of observation In use the whole assembly is supported by asbestos board spacers in a water-cooled brass housing which replaces the existing sample compartment liner of a commercial spectrometer. It is positioned for the cell to be correctly aligned in the sample beam.

Nickel foil plates with rectangular apertures conforming to the infrared beam geometry are provided next to each end of the cell for these to help in reducing the possibility of sample vapors entering the instrument.

In one experiment zinc chloride was placed in a silica boat 17 and heated until dry. The generator 5 was then heated to vaporize the sample at the desired temperature which was also maintained in the tube 6, the tube 14 and the cell 4. The cell 4 was positioned in a commercial infrared spectrometer.

Prior to activating the spectrometer the jet and carrier gas flow rates are adjusted to give optimum spectra with minimum noise. Normal scanning then took place at a temperature of 700 C. The resulting spectrum was then a superposition of absorption and emission. To obtain pure emission a metal shutter was placed between the spectometer light source and the cell. The pure absorption spectrum was then calculated by subtraction. In practice scanning of each of the read spectra was done three times and the results averaged.

In the example of zinc chloride the strong absorption band centered at 510 cm. $-1$ reported in the literature was in fact also found with the apparatus and method of the invention.

In another experiment the absorption and emission spectra of carbon dioxide were determined at temperatures from 25° C. and 800° C. In this case the generator 5 was empty and the carbon dioxide gas was bled into the tube 6. The spectra obtained exhibited fine structure even at temperatures as high as 800° C.

In order to show the applicability of the cell to volatile reactive liquids the spectrum of titanium tetrachloride vapor was measured at temperatures between ambient and 700° C.

In a test to check the level of noise introduced by possible variations of sample concentration within the cell the measuring instrument was at 521 cm. $-1$ (the strongest absorption frequency of zinc chloride) and scanning took place at this fixed frequency for 5 minutes. At no time did the random movements of the recording pen exceed 2 percent of full scale deflection. The noise level is thus acceptably low.

The cell of the invention has no intrinsic wave length limitation. Thus the cell can be used with equal success in ultraviolet spectrometry. The high temperature capability is limited only by the materials of construction and insulation. Wet or corrosive samples can be handled. The cell can be used in standard commercial spectrometers, the cell length being chosen to suit the instrument in question.

I claim:

1. A cell for use in the spectral analysis of gases at high temperatures comprising a closed hollow body, at least one window into the body consisting in an open aperture through which gas can flow and electromagnetic radiations can pass, an inlet to the body consisting in an open aperture through which to the body of gases to be analyzed, and means to cause a curtain of an inert gas to flow adjacent and parallel to the plane of the aperture to seal off the cell.

2. The cell claimed in claim 1 in which the body has two opposed windows and including means to cause a curtain to inert gas to flow adjacent and parallel to the plane of the aperture of each window.

3. The cell claimed in claim 2 in which the body has two opposed planar ends each formed with a window, a cavity is provided below each window with means for connecting it to a source of gas under pressure, and a slot opening from each cavity in a direction across the plane of the window.

4. The cell claimed in claim 3 in which each end is curved above the window to cause convergence of gas flow above the center of the cell.

5. A method of making a spectral analysis of a material in gas from consisting in the steps of continuously introducing the gas into a cavity formed with at least one opening, flowing and inert gas in curtain form over the opening, and examining electromagnetic radiations passing through the opening.

6. The method claimed in claim 5 including the step of heating the material before introducing it into the cavity.

7. The method claimed in claim 6 including the step of heating the material in the cavity.

8. The method claimed in claim 5 including the step of heating the inert gas.

9. The method claimed in claim 5 in which the material is introduced into a cavity with top opposed openings and including the step of causing an electromagnetic radiation to enter at one opening and leave at another opening and examining the emergent radiation.

10. The method claimed in claim 9 in which the radiation that is passed through is in the infrared part of the spectrum.

* * * * *